(12) United States Patent
Redding et al.

(10) Patent No.: US 7,650,963 B2
(45) Date of Patent: *Jan. 26, 2010

(54) ACOUSTIC ISOLATOR FOR WELL LOGGING SYSTEM

(75) Inventors: Charles E. Redding, Houston, TX (US); Herbert W. Beimgraben, Spring, TX (US); Charles Hartmann, Houston, TX (US); Douglas Patterson, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 54 days.

This patent is subject to a terminal disclaimer.

(21) Appl. No.: 10/889,536

(22) Filed: Jul. 12, 2004

(65) Prior Publication Data

US 2005/0034858 A1     Feb. 17, 2005

Related U.S. Application Data

(62) Division of application No. 10/345,730, filed on Jan. 16, 2003, now Pat. No. 6,820,716.

(51) Int. Cl.
*G01V 1/30* (2006.01)

(52) U.S. Cl. .............. 181/207; 181/208; 181/209; 181/106; 181/113; 181/122; 367/162

(58) Field of Classification Search ........ 181/207, 181/208, 209, 106, 108, 111, 112, 113, 122, 181/206; 367/162, 176, 31, 159, 35, 188, 367/189, 901

See application file for complete search history.

(56) References Cited

U.S. PATENT DOCUMENTS

| | | | |
|---|---|---|---|
| 3,191,141 A | 6/1965 | Schuster | |
| 3,773,285 A | 11/1973 | Morrill | |
| 3,876,016 A * | 4/1975 | Stinson | 175/45 |
| 4,442,908 A * | 4/1984 | Steenbock | 175/74 |
| 4,529,055 A | 7/1985 | Gotoh et al. | |
| 4,564,160 A | 1/1986 | Vermilye | |
| 4,821,980 A | 4/1989 | Clausen et al. | |
| 4,872,526 A | 10/1989 | Wignall et al. | |
| 5,170,018 A | 12/1992 | Potier | |
| 5,229,553 A | 7/1993 | Lester et al. | |
| 5,343,001 A | 8/1994 | Cowles et al. | |
| 5,373,906 A * | 12/1994 | Braddick | 175/67 |
| 5,433,548 A * | 7/1995 | Roberts et al. | 403/74 |
| 5,510,582 A | 4/1996 | Birchak et al. | |
| 5,728,978 A * | 3/1998 | Roberts et al. | 181/102 |
| 5,731,550 A | 3/1998 | Lester et al. | |
| 5,852,262 A | 12/1998 | Gill et al. | |
| 6,059,661 A * | 5/2000 | Simpson | 464/19 |
| 6,082,484 A | 7/2000 | Molz et al. | |
| 6,287,206 B1 * | 9/2001 | Stage | 464/119 |
| 6,484,801 B2 * | 11/2002 | Brewer et al. | 166/65.1 |

(Continued)

*Primary Examiner*—Elvin G Enad
*Assistant Examiner*—Jeremy Luks
(74) *Attorney, Agent, or Firm*—Madan & Sriram, P.C.

(57) ABSTRACT

An acoustic isolator for attenuating through-tool acoustic signals comprises a plurality of u-shaped link members, where each link member has two sets of ears. A plurality of yoke members are adapted to fit between cooperating sets of ears. A plurality of pins connect the plurality of u-shaped link members to the plurality of yoke members for providing limited flexural compliance. The isolator may be made from metallic and/or composite materials.

22 Claims, 5 Drawing Sheets

U.S. PATENT DOCUMENTS

| | | |
|---|---|---|
| 6,535,458 B2 | 3/2003 | Meehan |
| 6,588,267 B1 | 7/2003 | Bradley |
| 6,643,221 B1 | 11/2003 | Hsu et al. |
| 6,820,716 B2 * | 11/2004 | Redding et al. ............. 181/106 |
| 2002/0111218 A1 * | 8/2002 | Kurzeja et al. ................ 464/70 |

* cited by examiner

ACOUSTIC ISOLATOR FOR WELL LOGGING SYSTEM

CROSS-REFERENCE TO RELATED APPLICATIONS

This application is a Divisional of U.S. patent application Ser. No. 10/345,730 filed on Jan. 16, 2003 now U.S. Pat. No. 6,820,716, which is incorporated herein by reference.

BACKGROUND OF THE INVENTION

1. Field of the Invention

The present invention pertains to acoustic well logging and more particularly to an acoustic isolator for use in an acoustic logging system.

2. Related Prior Art

Acoustic logging tools for measuring properties of the sidewall material of both cased and uncased boreholes are well known. Essentially such tools measure the travel time of an acoustic pulse propagating through the sidewall material over a known distance. In some studies, the amplitude and frequency of the acoustic pulse, after passage through the earth, are of interest.

In its simplest form, an acoustic logger consists of one or more transmitter transducers that periodically emit an acoustic signal into the formation around the borehole. One or more receiver transducers, spaced apart by a known distance from the transmitter, receives the signal after passage through the surrounding formation. The difference in time between signal transmission and signal reception divided into the distance between the transducers is the formation velocity. If the transducers do not contact the borehole sidewall, allowance must be made for time delays through the borehole fluid.

Throughout this disclosure, the term "velocity", unless otherwise qualified, shall be taken to mean the velocity of propagation of an acoustic wavefield through an elastic medium. Acoustic wavefields propagate through elastic media in different modes. The modes include: compressional or P-waves, wherein particle motion is in the direction of wave travel; transverse shear or S-waves, which, assuming a homogeneous, isotropic medium, may be polarized in two orthogonal directions, with motion perpendicular to the direction of wave travel; Stonley waves, which are guided waves that propagate along the fluid-solid boundary of the borehole; and compressional waves that propagate through the borehole fluid itself. There also exist asymmetrical flexural waves as will be discussed later.

P-waves propagate through both fluids and solids. Shear waves cannot exist in a fluid. Compressional waves propagating through the borehole fluid may be mode-converted to shear waves in the borehole sidewall material by refraction provided the shear-wave velocity of the medium is greater than the compressional-wave velocity of the borehole fluids. If that is not true, then shear waves in the sidewall material can be generated only by direct excitation.

Among other parameters, the various modes of propagation are distinguishable by their relative velocities. The velocity of compressional and shear waves is a function of the elastic constants and the density of the medium through which the waves travel. The S-wave velocity is, for practical purposes, about half that of P-waves. Stonley waves may be somewhat slower than S-waves. Compressional wavefields propagating through the borehole fluid are usually slower than formational shear waves but for boreholes drilled into certain types of soft formations, the borehole fluid velocity may be greater than the sidewall formation S-wave velocity. The velocity of flexural waves is said to approach the S-wave velocity as an inverse function of the acoustic excitation frequency. Some authors refer to flexural waves as pseudo-Raleigh waves.

In borehole logging, a study of the different acoustic propagation modes provides diagnostic information about the elastic constants of the formation, rock texture, fluid content, permeability, rock fracturing, the goodness of a cement bond to the well casing and other data. Typically, the output display from an acoustic logging tool takes the form of time-scale recordings of the wave train as seen at many different depth levels in the borehole, each wave train including many overlapping events that represent all of the wavefield propagation modes. For quantitative analysis, it is necessary to isolate the respective wavefield modes. S-waves are of particular interest. But because the S-wave arrival time is later than the P-wave arrival time, the S-wave event often is contaminated by later cycles of the P-wave and by interference from other late-arriving events. Therefore, known logging tools are designed to suppress undesired wave fields either by judicious design of the hardware or by post-processing using suitable software. Both monopole and dipole signals may be transmitted and received using appropriately configured transducers. Because the systems measures signal transit time, it is crucial that the spatial relationship between the transmitter and receivers remain essentially constant during logging. For monopole signals, the distance between transmitter and receivers should remain essentially constant. For dipole signals, both the distance and rotational orientation between transmitters and receivers should remain essentially constant during logging.

As is well known, the acoustic transmitter and the acoustic receivers are mounted at opposite ends of a logging sonde. The body of the sonde is usually of a suitable metal such as stainless steel or the like which is acoustically conductive. Therefore, in order to prevent unwanted acoustic energy traveling up the sonde from interfering with desired acoustic energy propagating through the formation, is it required that an acoustic isolator be inserted in the sonde between the transmitter and the receivers.

In addition, the deployment of acoustic tools using coiled tubing or drill pipe has increased the loading, both axial and rotational, on the acoustic sonde. For example, in highly deviated or horizontal wellbores, the logging tool may be deployed with drill pipe. The drill pipe may be slowly rotated to reduce the frictional resistance between the pipe and the borehole wall while deploying or extracting the logging tool. Residual axial and/or rotational loading may be transferred through the acoustic logging tool, even during the logging sequence.

Prior art isolators, commonly used with wireline deployment, have proven to be fragile or to deform excessively, either axially or rotationally, under the high loading encountered in pipe conveyed logging. For example, U.S. Pat. No. 3,191,141, issued Jun. 22, 1965 to Schuster, describes a slotted sleeve isolator placed between a transmitter and a receiver. The slotted arrangement forms a serpentine travel path for acoustic wave energy, both delaying and attenuating the wave. The slotted sleeve is often adequate for tools with only monopole transmitters, but has often proved inadequate for dipole or other forms of multipole transmissions. In addition, the slotted configuration has proven to be fragile in high axial loading situations.

U.S. Pat. No. 4,872,526, issued Oct. 10, 1989 to A. Wignall et al., U.S. Pat. No. 5,728,978 to Roberts et al., and U.S. Pat. No. 5,229,553 to Lester et al., all use a plurality of captured elastomeric, typically rubber, elements to provide through-tool signal attenuation. The elastomeric elements unacceptably deform both axially and rotationally under the high loading of pipe conveyed logging. This deformation results in unacceptable errors in the resulting logs, especially from multi-pole sources.

There is a need for an acoustic isolator that will be sufficiently flexible to pass through deviated boreholes yet sufficiently rigid to provide axial and rotational dimensional stability between the transmitters and receivers of the logging tool.

SUMMARY OF THE INVENTION

The present invention provides a system and method for attenuating through-tool acoustic signals in an acoustic logging tool.

In one aspect of the present invention, an acoustic isolator for attenuating through-tool acoustic signals, comprises a plurality of u-shaped link members, where each link member has two sets of ears. A plurality of yoke members are adapted to fit between cooperating sets of ears. A plurality of pins connect the plurality of u-shaped link members to the plurality of yoke members for providing limited flexural compliance.

In another aspect, a system for determining the acoustic properties of a formation surrounding a wellbore, comprises a tubular member extending in the wellbore from a surface location to a downhole formation of interest. An acoustic logging tool is attached proximate a bottom end of the tubular member, wherein the acoustic logging tool has a transmitter section; a receiver section; and a pin-connected acoustic isolator for attenuating through-tool acoustic signals.

In one embodiment, a method for performing acoustic investigations of a formation surrounding a wellbore, comprises conveying an acoustic logging tool into the wellbore. At least one acoustic source is activated for generating acoustic signals in the formation and the logging tool. The through-tool acoustic signals are attenuated using an acoustic isolator comprising a plurality of u-shaped link members cooperatively pinned together through a plurality of yoke members. Signals through the formation and the attenuated through-tool signals are received with at least one receiver in a receiver section on a side of the acoustic isolator opposite from the acoustic source.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DESCRIPTION OF THE PREFERRED EMBODIMENT

The present invention provides a system and method for attenuating acoustic waves in a down hole tool that is being used to obtain information about subsurface formations, some of which are believed to be holding hydrocarbon deposits.

As used herein, the tool axis refers to a longitudinal axis of the tool that is substantially parallel to the centerline of the wellbore. Angular deviations refer to angles relative to the tool axis. Rotation refers to rotation about the tool axis.

Figure 1:
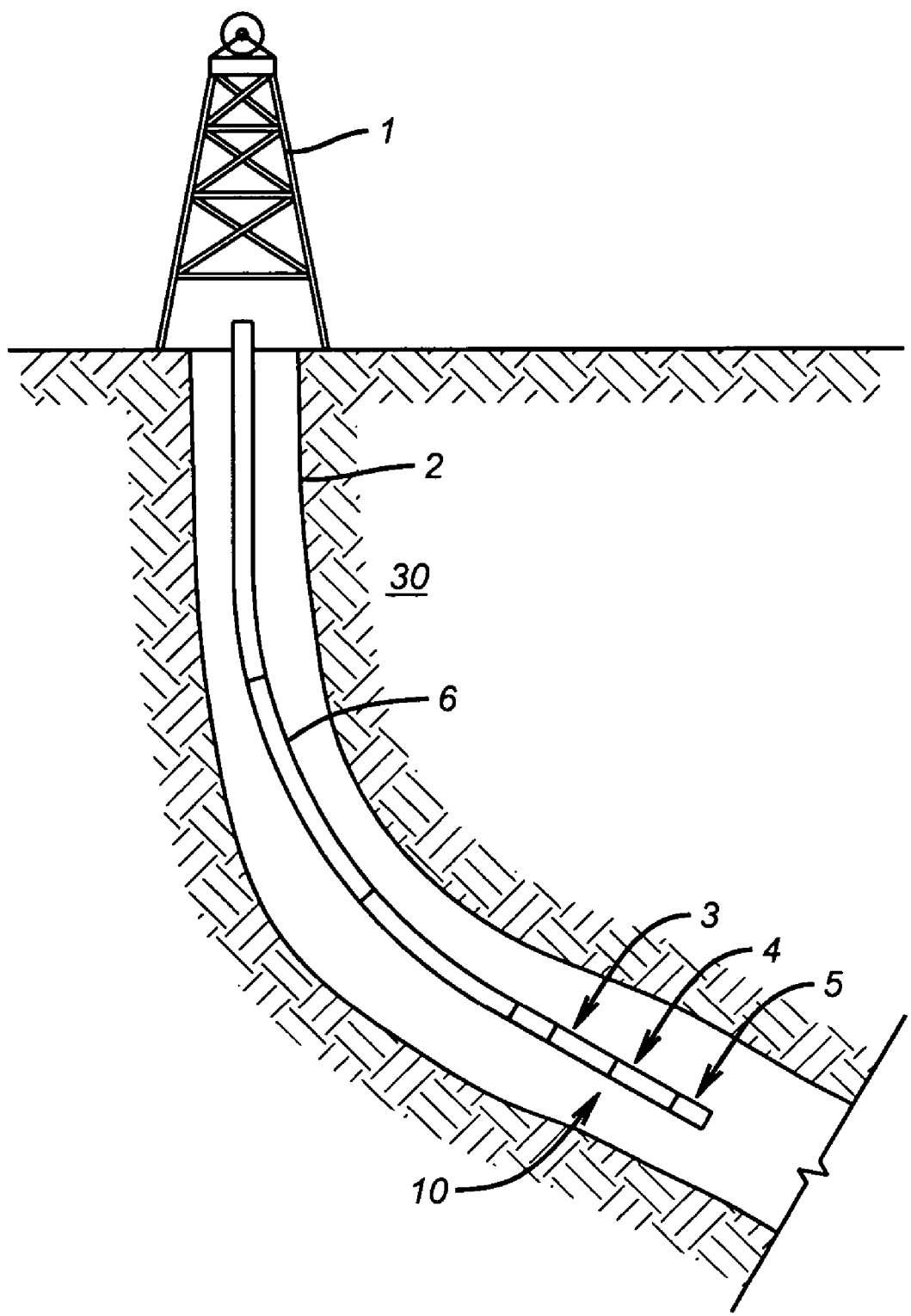
FIG. 1 is a schematic drawing of a logging system in a wellbore according to one preferred embodiment of the present invention.

FIG. 1 shows a conventional drilling rig 1, from which a jointed pipe 6 is conveyed into a wellbore 2. The wellbore 2 may be deviated, including substantially horizontal sections (not shown). An acoustic logging tool 10 is attached near the bottom of the jointed pipe 6. As is common in the art, other logging tools (not shown) may be attached to the acoustic logging tool 10 above and/or below the acoustic logging tool 10. The jointed pipe 6 is sufficiently stiff to convey the logging tools into such deviated wellbores without buckling. As such, the logging tool 10 may experience substantial axial loads. In addition, the jointed pipe 6 may be rotated during deployment to reduce the friction against a sidewall of the wellbore 2 or to orient the logging tool in a preferred manner with respect to the formation 30.

Figure 2:
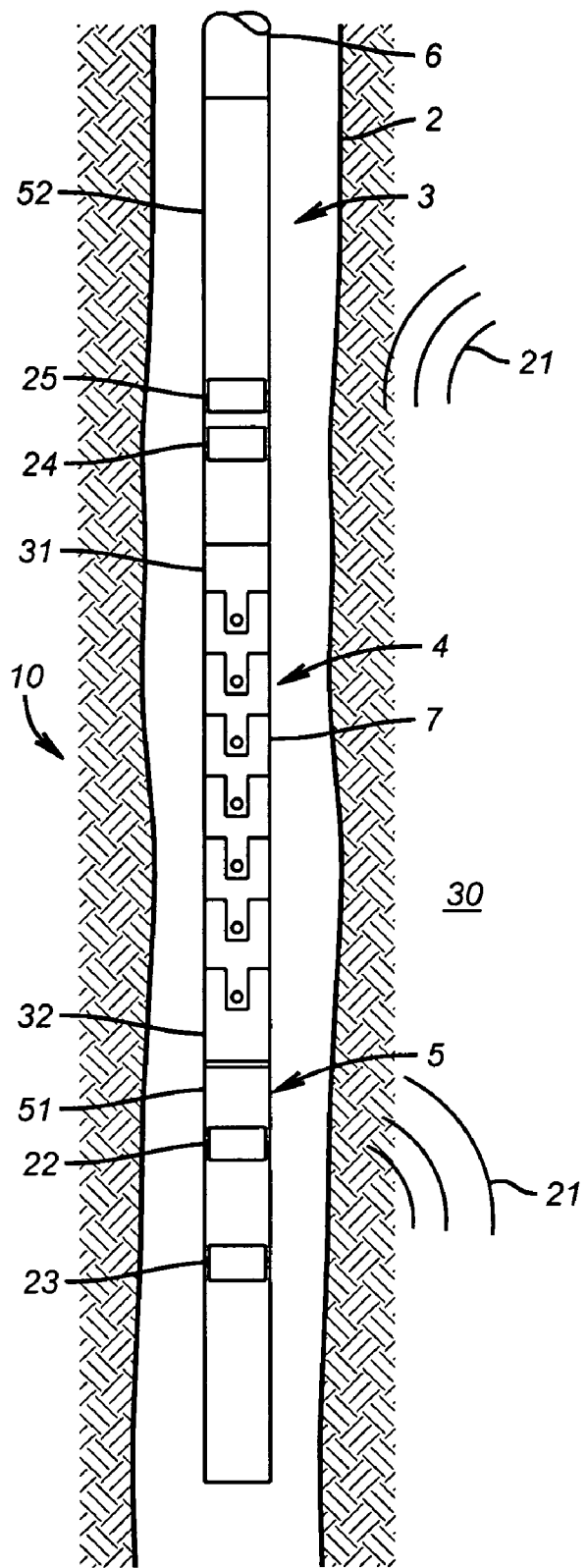
FIG. 2 is a schematic drawing of an acoustic logging tool in a wellbore according to one preferred embodiment of the present invention.

The acoustic logging tool 10, shown in FIG. 2, comprises a transmitter section 5, a receiver section 3, and an acoustic isolator 4 positioned between the transmitter section 5 and the receiver section 3. It should be noted that location of the transmitter section 5 and the receiver section 3, in FIG. 2, is exemplary, and they may be easily interchanged in location on either side of isolator 4. The transmitter section 5 may have monopole 22 and/or dipole 23 type sources, located in transmitter housing 51, for transmitting corresponding acoustic signals 21 into the formation 30 surrounding wellbore 2. Examples of such sources are described in U.S. Pat. No. 5,229,553 incorporated herein by reference. The signals 21 propagate through the formation 30 and are received at monopole 24 and/or dipole 25 receivers, located in receiver housing 52, in receiver section 3. Multiple monopole and/or dipole receivers may be located at predetermined axial spacings in receiver section 3. The dipole receivers 25 may be set at predetermined rotational orientations with respect to the dipole sources 23.

Figure 3B:
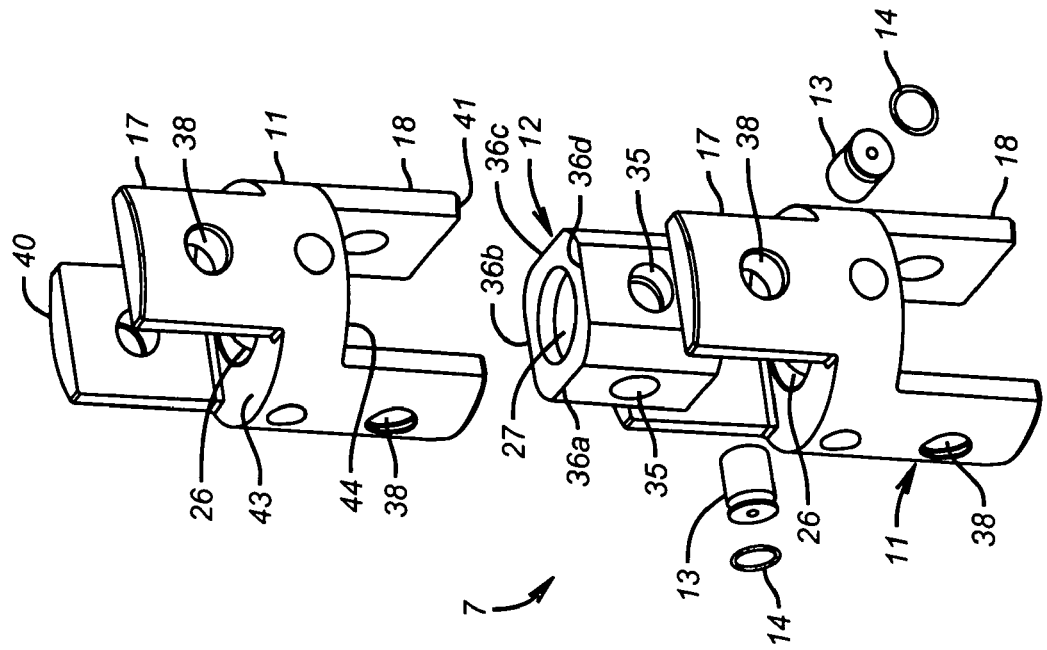
FIG. 3B is an exploded view of the parts of FIG. 3A according to one preferred embodiment of the present invention.
Figure 3A:
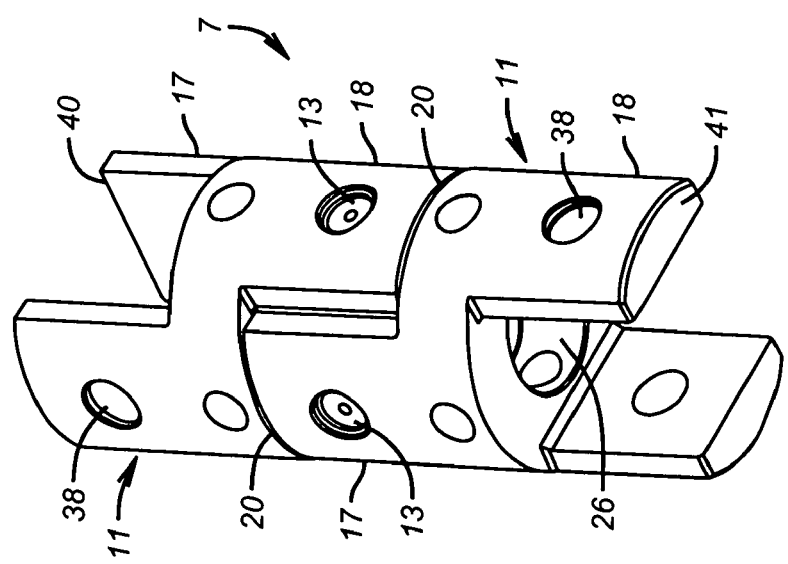
FIG. 3A is a schematic drawing of a portion of an isolator assembly according to one preferred embodiment of the present invention.

An acoustic isolator section 4, see FIG. 2, is placed between the transmitter section 5 and the receiver section 3 and is connected to transmitter and receiver housings 51 and 52 respectively, to attenuate acoustic signals that may propagate through the tool housings 52, 51 of the transmitter and receiver sections 3,5. As previously discussed, these through-tool signals may contaminate and/or interfere with the signals 21 through the formation causing errors in interpretation of the properties of formation 30. The acoustic isolator 4 is comprised of a predetermined number of serially connected universal-type joints 7. Referring to FIGS. 3A and 3B, each universal joint 7 comprises an inner yoke member 12, two outer link members 11 having ears 17, 18, and pins 13 for connecting the ears 17, 18 to the yoke 12. The ears 17 are formed substantially orthogonal to the ears 18. The yoke 12 has a through hole 27 for allowing passage of electrical wires for electrical communication between the transmitter and receiver sections. Additionally, the yoke 12 has four sides 36a-d, where 36a,c are substantially parallel to each other and 36b,d are substantially parallel to each other. In addition, sides 36a,c are substantially orthogonal to sides 36b,d. Counter-bored holes 35 are formed in each of the sides and have shoulders (not shown) for seating pins 13. The ears 17,18 of the link member 11 have corresponding bored holes 38, sized to receive pin 13.

At assembly, the yoke member 12 is captured between ears 17 and 18 of two link members 11, see FIG. 3B, such that the holes 35 in yoke member 12 align with the hole 38 in ears 17 and 18 of the link members 11. Typically, four pins 13 are inserted in each set of aligned holes 38,35 and are retained in position by a retaining device such as retaining ring 14 that fits into a suitable groove (not shown) in an inner diameter surface of hole 38. End caps 31,32, see FIG. 2, have a set of ears 17 on one end for connecting to the isolator joints 7, and a suitable connector, such as a threaded connection, on the other end for connecting to the receiver and transmitter sections 3,5. Electrical wires (not shown are fed through the center holes 26, 27 of the multiple joints and fed through suitable electrical connectors to connect to between the transmitter 5 and receiver sections 3 of the tool.

The end surfaces 40,41 of ears 17,18, see FIGS. 3A,B are substantially flat in contrast to a common universal joint wherein the corresponding surfaces are curved to allow free rotational motion of the link members. Likewise, the surfaces 43,44 of the body of link member 11 are substantially flat. When assembled, the surfaces 40,41 and 43,44 are separated by a gap 20. As will be appreciated by one skilled in the art, the interaction of the flat surfaces provide a limited flexure of the universal joint about the pinned connections of both axes defined by the pinned connections. The limited flexure can be adjusted by appropriately adjusting the dimensions of the ears 17, 18 to provide a smaller or larger gap 20. The axial and torsional loading capacities are essentially determined by the dimensions of the pins 13 and ears 17,18 while the desired length and rotational stability are determined by the clearances and tolerances between the pins 13 and the bore holes 35 and 38. Note that nominal machining tolerances, common in the art, are sufficient to establish axial and rotational alignment of transmitters and receivers using the present invention. The present invention may be scaled up or down to accommodate different tool sizes for different hole sizes as is common in the art.

Figure 4:
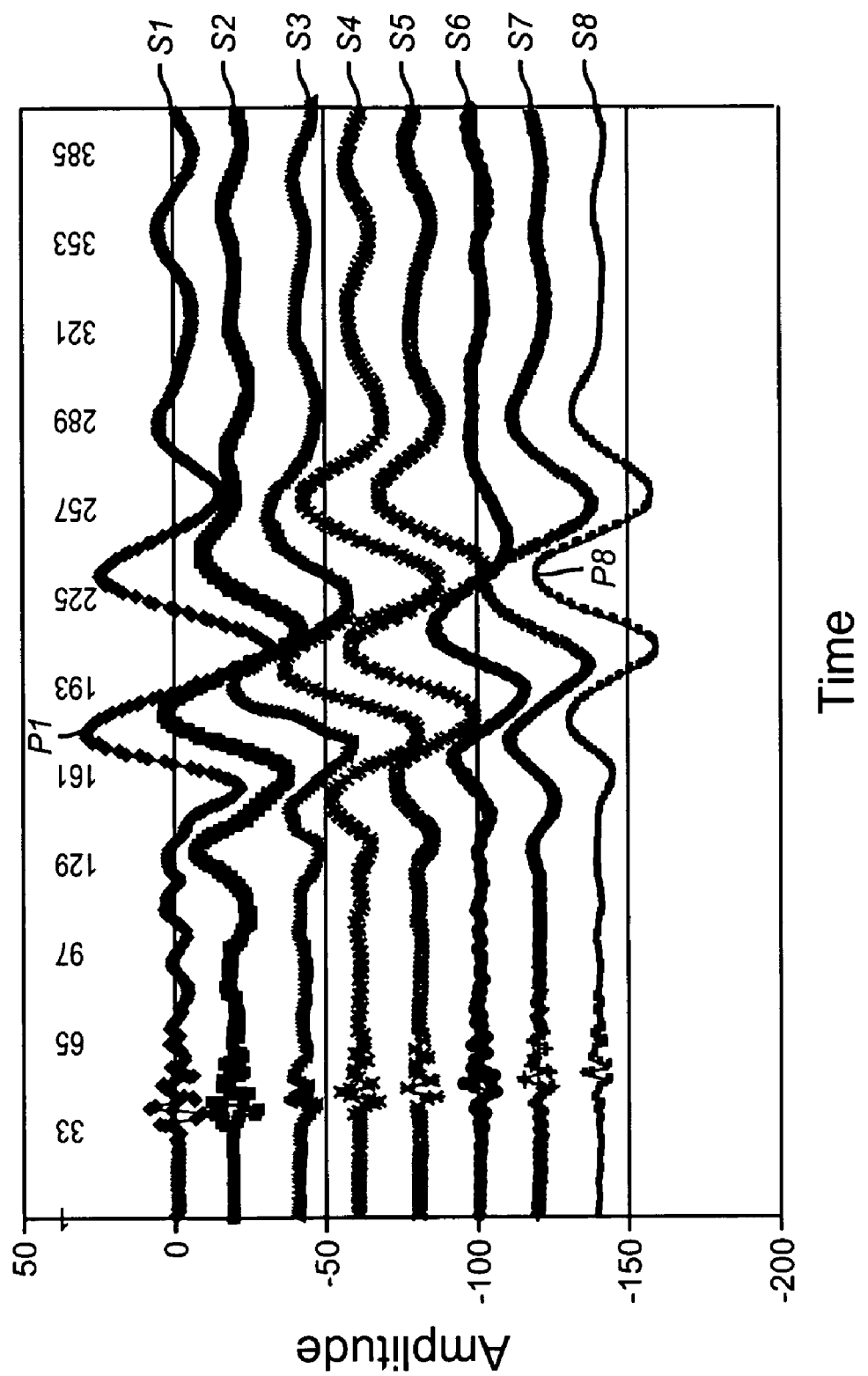
FIG. 4 is a chart of received acoustic signals using a prior art isolator.
Figure 5:
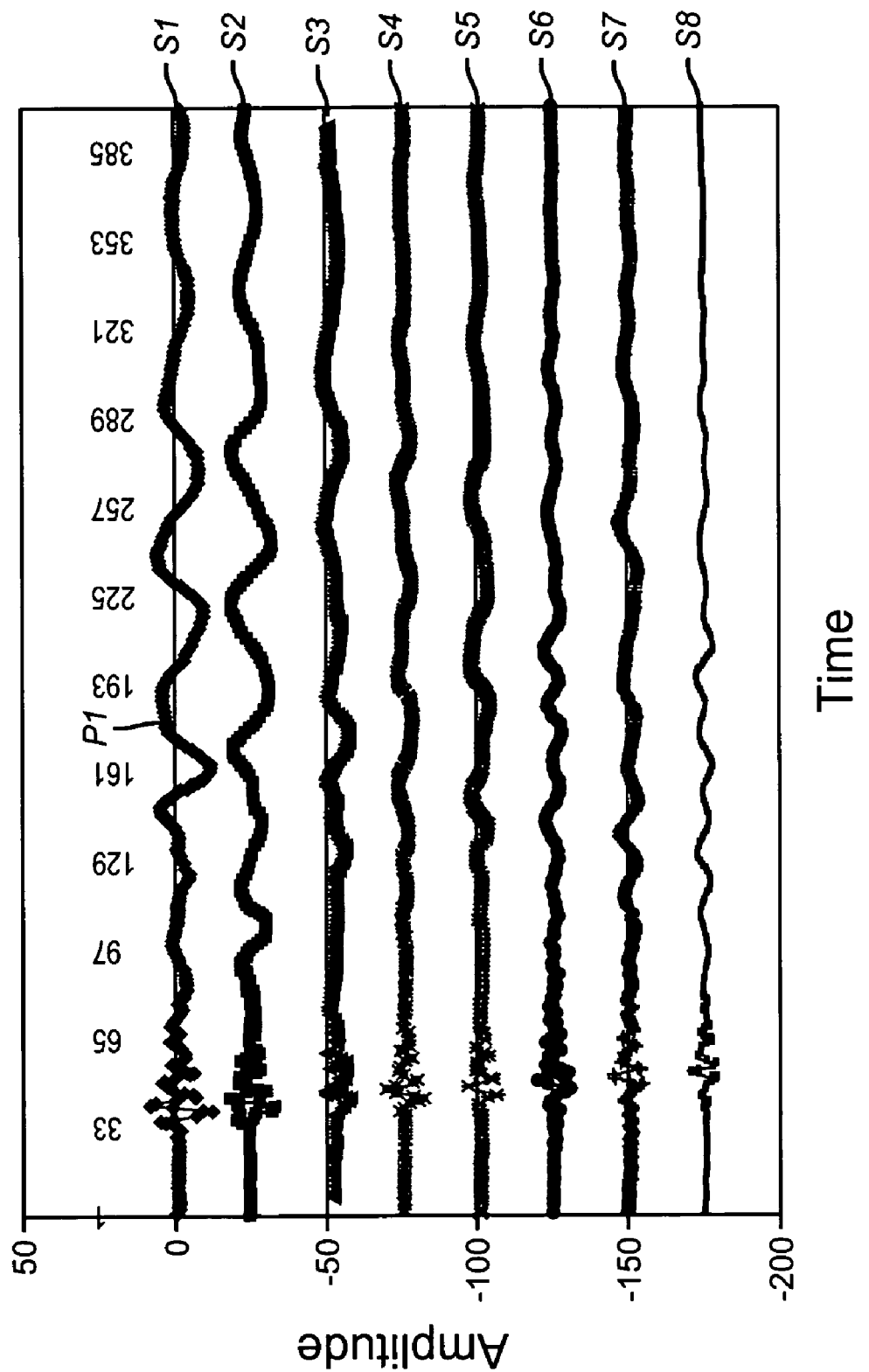
FIG. 5 is a chart of received acoustic signals using an acoustic isolator according to one preferred embodiment of the present invention.

The limited flexural movement of the joints 7 provides sufficient compliance to substantially attenuate the acoustic shear modes of transmission through the tool. The acoustic longitudinal mode is substantially attenuated by the elongated path and the acoustic transfer across the multiple pinned connections. FIGS. 4 and 5 illustrate the attenuation improvement in an exemplary isolator having ten joint sections 7 as compared to a prior art isolator such as that described in U.S. Pat. No. 5,229,553. FIG. 4 shows the received signal amplitudes S1-S8 as a function of time for an array of eight spaced apart receiver transducers in the receiver section. Received signal peaks are indicated by P1-P8 where indicators P2-P7 have been omitted from FIGS. 4 and 5 to avoid confusion. Note that the peaks P1-P8 are skewed in time relative to each other indicating the increased travel time to the successive spaced apart transducers. FIG. 5 shows the signals received by the same eight transducers using the isolator of the present invention. The chart is plotted using the same amplitude and time scales as used in FIG. 4. As is clearly seen, the amplitude of the received signals, as exemplified by P1, are greatly attenuated using the isolator of this invention. The peaks P2-P8 have been attenuated such that they are not readily discernible.

In a preferred embodiment, the isolator joints 7 are made of metallic materials. Alternatively, the isolator joints 7 may be made of fiber reinforced composite materials known in the art. In yet another alternative embodiment, the joints may be of a hybrid construction using both metallic and composite materials.

While there has been illustrated and described a particular embodiment of the present invention, it will be appreciated that numerous changes and modifications will occur to those skilled in the art, and it is intended in the appended claims to cover all those changes and modifications.

What is claimed is:

1. An acoustic isolator for attenuating an acoustic signal, comprising:
   a plurality of serially connected universal joints, each joint having substantially the same structure, each joint further including:
   a link member having a set of ears;
   a second member adapted to be inserted between the set of ears; and
   a connector between the second member and the set of ears of the link member such that the acoustic signal is attenuated when transmitted from said link member to said second member through said connector.

2. The acoustic isolator of claim 1, further comprising a pair of end caps for connecting a transmitter section and a receiver section to the isolator.

3. The acoustic isolator of claim 1, wherein each link member and each second member have an axial bore for passing at least one wire.

4. The acoustic isolator of claim 1, wherein the acoustic isolator is made at least in part from at least one of (i) a metallic material; (ii) a composite material; and (iii) a combination of a metallic and a composite material.

5. The acoustic isolator of claim 1 wherein the end surface of each ear is substantially flat for providing a flexural movement of the isolator.

6. The acoustic isolator of claim 1, wherein the connector is a connecting pin.

7. An acoustic isolator for attenuating an acoustic signal in a downhole acoustic tool string, comprising a plurality of joints, each joint having substantially the same structure, each joint further having at least one first element coupled by at least one connector pin to at least one second element such that an acoustic signal is attenuated when traveling from said first member to said second member through said connector pin.

8. The acoustic isolator of claim 7, further comprising a first end cap connecting a transmitter section to a first end of the acoustic isolator and a second end cap connecting a receiver section to a second end of the acoustic isolator.

9. The acoustic isolator of claim 7, wherein the at least one first member comprises a u-shaped link member having at least one axial bore for passing at least one wire therethrough.

10. The acoustic isolator of claim 7, wherein the at least one second member comprises a yoke member having at least one axial bore for passing at least one wire therethrough.

11. The acoustic isolator of claim 7, wherein the acoustic isolator is made at least in part from at least one of (i) a metallic material; (ii) a composite material; and (iii) a combination of a metallic material and a composite material.

12. The acoustic isolator of claim 9, wherein the u-shaped link member comprises a first pair of ears on a first end of said acoustic isolator and a second pair of ears on a second end of said acoustic isolator opposite from the first end.

13. The acoustic isolator of claim 12, wherein the first pair of ears is substantially orthogonal to the second pair of ears.

14. The acoustic isolator of claim 13 wherein an end surface of each ear is substantially flat for providing a flexural movement of the isolator.

15. A method for using an acoustic isolator to attenuate an acoustic signal, comprising:

coupling a plurality of joints in series, each joint having substantially the same structure, wherein each joint further includes at least one first element connected by at least one pin connector to at least one second element such that the acoustic signal is attenuated when traveling from said first element to said second element through said at least one pin connector.

16. The method of claim 15, further comprising coupling a transmitter section to a first end of said acoustic isolator and a receiver section to a second end of the acoustic isolator.

17. The method of claim 15, wherein the at least one first member comprises a u-shaped link member having at least one axial bore for passing at least one wire therethrough.

18. The method of claim 15, wherein the at least one second member comprises a yoke member having at least one axial bore for passing at least one wire therethrough.

19. The method of claim 15, wherein the acoustic isolator is made at least in part from at least one of (i) a metallic material; (ii) a composite material; and (iii) a combination of a metallic material and an composite material.

20. The method of claim 17, wherein the u-shaped link member comprises a first pair of ears on a first end of the acoustic isolator and a second pair of ears on a second end of the acoustic isolator opposite from said first end.

21. The method of claim 20, wherein the first pair of ears is substantially orthogonal to the second pair of ears.

22. The method of claim 21 wherein an end surface of each ear is substantially flat for providing a limited flexural movement of the isolator.

* * * * *